United States Patent
Yadav et al.

(10) Patent No.: US 11,930,076 B1
(45) Date of Patent: Mar. 12, 2024

(54) OFFLOAD INEFFICIENT SLICING FROM CLIENTS TO THE SERVERS

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/957,411

(22) Filed: Sep. 30, 2022

(51) Int. Cl.
| | |
|---|---|
| *H04L 67/1097* | (2022.01) |
| *G06F 16/172* | (2019.01) |
| *G06F 16/176* | (2019.01) |

(52) U.S. Cl.
CPC ........ *H04L 67/1097* (2013.01); *G06F 16/172* (2019.01); *G06F 16/176* (2019.01)

(58) Field of Classification Search
CPC .................................................. H04L 67/1097
See application file for complete search history.

(56) References Cited

U.S. PATENT DOCUMENTS

| | | | |
|---|---|---|---|
| 2017/0041375 A1* | 2/2017 | Panchapakesan | ..... H04L 65/762 |
| 2018/0152741 A1* | 5/2018 | Asarikuniyil | ...... H04N 21/4334 |
| 2019/0132414 A1* | 5/2019 | Bongaarts | .............. G06V 20/40 |

* cited by examiner

*Primary Examiner* — Shean Tokuta
(74) *Attorney, Agent, or Firm* — Chamberlain, Hrdlicka, White, Williams & Aughtry; Aly Z. Dossa (57) ABSTRACT

Embodiments of the invention relate to methods and systems for efficiently sharing assets such as files and folders between a host computer system and a client computer system while minimizing the amount of work the client must perform to efficiently transfer an asset. In one or more embodiments, assets such as files and folders that are to be shared or transferred are placed in appropriate network slice queues by the hosts rather than the clients. These network slice queues allow the files and folders to be placed in slices without utilizing the resources of the clients as well as much of the available network resources. This ensures efficient use of network resources, while minimizing the amount of work the hosts and/or clients must perform in order to perform a backup.

18 Claims, 4 Drawing Sheets

OFFLOAD INEFFICIENT SLICING FROM CLIENTS TO THE SERVERS

BACKGROUND

As people increasingly rely on computing systems and devices to perform a plethora of tasks; the systems have become increasingly complex, and the opportunities for failure and/or loss of important data has also increased. Frequently, the need to transfer or share files from one system to another such as a client computer is needed. This may occur when performing backups or in the course of running various applications. However, traditional methods of transferring or sharing files are inefficient and use much of the available network bandwidth.

SUMMARY

In general, certain embodiments described herein relate to a method for sharing files. The method comprises of receiving a request, from a client, for an asset located on a production host. The production host then retrieves file-system meta-data associated with the asset and analyzes it to determine how to divide the data associated with the asset into slices. Once the production host finishes analyzing the meta-data associated with the asset, it then slices the asset into slices and sends the asset in the form of the slices to the client.

In general, certain embodiments described herein relate to a non-transitory computer readable medium comprising computer readable program code, which when executed by a computer processor enables the computer processor to perform a method for sharing files. The method comprises of receiving a request, from a client, for an asset located on a production host. The production host then retrieves file-system meta-data associated with the asset and analyzes it to determine how to divide the data associated with the asset into slices. Once the production host finishes analyzing the meta-data associated with the asset, it then slices the asset into slices and sends the asset in the form of the slices to the client.

In general, certain embodiments described herein relate to a system comprising: a production host that includes a processor and a memory. The memory includes instructions, which when executed by the processor, perform a method for sharing files. The method comprises of receiving a request, from a client, for an asset located on the production host. The production host then retrieves file-system meta-data associated with the asset and analyzes it to determine how to divide the data associated with the asset into slices. Once the production host finishes analyzing the meta-data associated with the asset, it then slices the asset into slices and sends the asset in the form of the slices to the client.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase "operatively connected", or "operative connection", means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In many traditional data protection and management solutions for client/server architectures, there are multiple clients/proxies that retrieve assets (e.g., files and/or folders) from hosts (also referred to as production hosts). Clients send a request for a desired asset on the host and then each client crawls the files and/or folders over the network to get a list of files and folders located on the host(s) that are associated with the desired asset. The files and folders that the client wants to access, such as for performing a backup, are grouped together by the client, and sliced to form manageable slices of the asset. Once the client has grouped the files and folders together and determined how to slice them, the host places the files and folders associated with the asset in slices and sends them to the client. This entire process is time consuming, places high strain on the network resources, and resource exhaustive both for the client and the host.

In accordance with one or more embodiments, this process is made more efficient by having the assets, including its associated files and folders, which are to be shared or transferred, sorted, divided, and placed in appropriate network slice queues by the hosts rather than the clients. This is done without utilizing (or minimal use of) the resources of the clients as well as much of the available network resources. Further, this is done without crawling the entire file-system(s) of the host(s) by leveraging file-system metadata associated with the host(s). This ensures efficient use of network resources as network resources are only needed for the initial request and for transferring the slices/assets. This also minimizes the amount of work the host(s) and/or client(s) must perform in order to share or transfer an asset.

The following describes various embodiments of the invention.

Figure 1A:
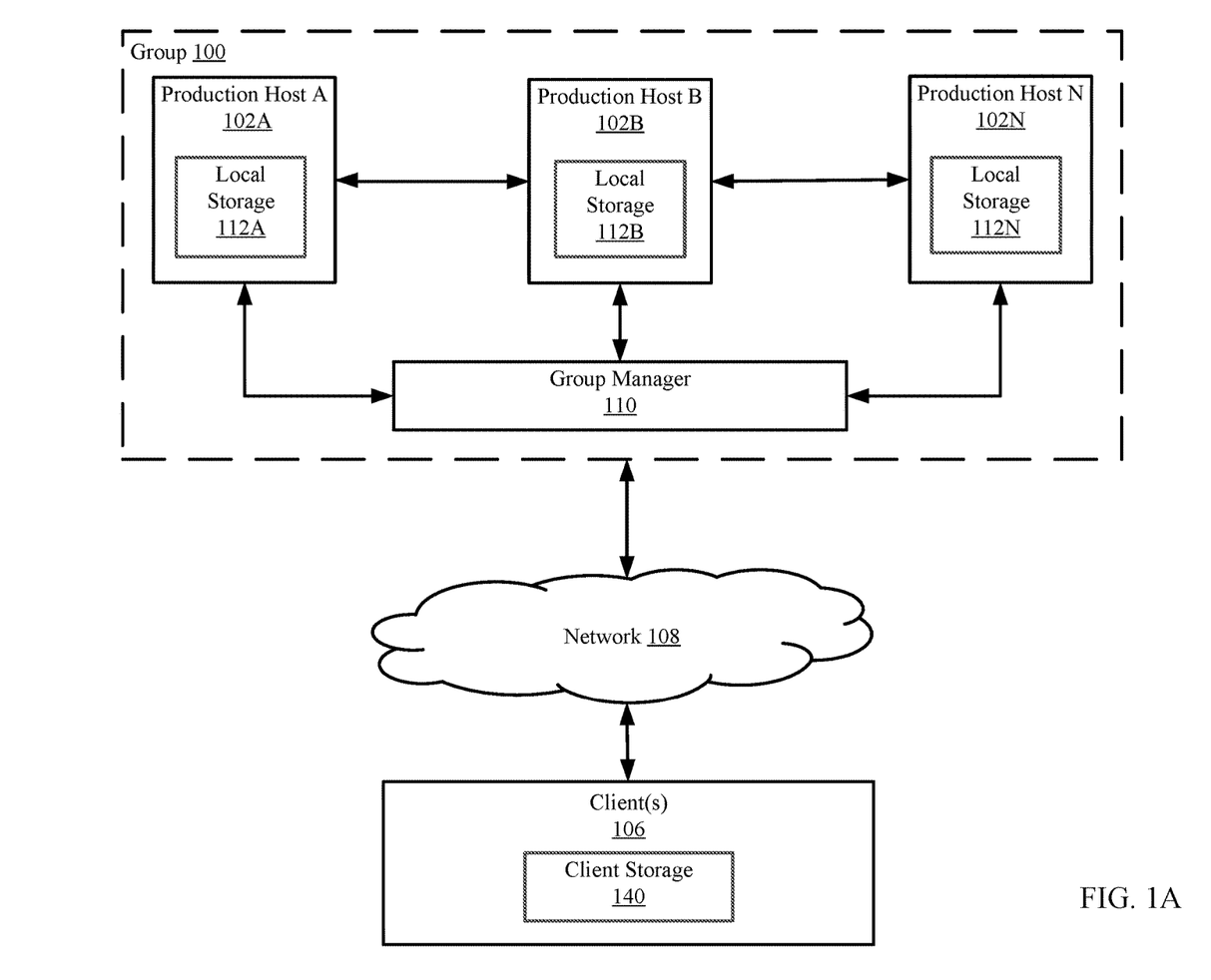
FIG. 1A shows a diagram of a system in accordance with one or more embodiments of the invention.

FIG. 1A shows a diagram of a system in accordance with one or more embodiments of the invention. The system includes a group (100) that includes a plurality of hosts (e.g., 102A-102N) and a group manager (110). The system may include any number of hosts (e.g., 102A-102N) and groups (e.g., 100) without departing from the invention. For example, the system may include six hosts configured in two groups (not shown) that communicate through a network (108). The system may include additional, fewer, and/or other components without departing from the invention. Each of the components in the system may be operatively connected via any combination of wireless and/or wired networks (108). Each component illustrated in FIG. 1A is discussed below.

In one or more embodiments of the invention, the group (100) interacts with one or more clients (e.g., 106) via a network (108). The clients (e.g., 106) are separate computing systems or proxies that utilize the one or more hosts (e.g., 102A-102N) to provide data services to them. The clients (106), in one or more non-limiting examples, may be user's local computers that they use to access the resources of the group (100) including functioning as a remote desktop. Alternatively, in a separate set of examples, one or more of the clients (106), may be a separate backup server that runs backups on the hosts (e.g., 102A-102N). In one or more embodiments of the invention, the clients (106) may take any form that utilizes assets (such as but not limited to files and folders), data and/or applications associated with one or more hosts (e.g., 102A-102N).

In one or more embodiments of the invention assets such as data, files, folders, and/or applications may be shared or transferred back and forth between the client (e.g., 106) and the various hosts (e.g., 102A-102N). Any data related to an asset such as its files and folders may be stored in the client's storage (e.g., 140). The method of sharing or transferring files between the client (e.g., 106) and the hosts (e.g., 102A-102N), is described in more detail below with regards to the method shown in FIG. 2.

In one or more embodiments of the invention, the clients (e.g., 106) may interact with the production hosts (e.g., 102A-102N). For example, the clients (e.g., 106) may utilize application services provided by the production hosts (e.g., 104, 106). When the clients (e.g., 106) interact with the production hosts (e.g., 102A-102N), data that is relevant to the clients (e.g., 106) may be stored on the production hosts (e.g., 102A-102N). For example, consider a scenario in which the production hosts (e.g., 102A-102N) host a database utilized by the clients (e.g., 106). In this scenario, the database may be a user database associated with the users of the clients (e.g., 106). When a new user is identified, the clients (e.g., 106) may add information regarding the new user to the database. By doing so, the data that is relevant to the clients (e.g., 106) may be stored in the production hosts (e.g., 102A-102N). This may be done because the clients (e.g., 106) may desire access to the data regarding the new user at some point in time, the method of obtaining this data by the client will be discussed in more detail below with regards to method shown in FIG. 2.

In one or more embodiments of the invention, the clients (e.g., 106) may include functionality to use services provided by the production hosts (e.g., 102A-102N). For example, the clients (e.g., 106) may host local applications that interact with applications hosted by the production hosts (e.g., 102A-102N).

In one or more embodiments of the invention, the clients (106) include their own client storage (140). The client storage (140) may store data and/or files for local processing. Client storage (140) may include one or more processors, memory (e.g., random access memory), and persistent storage (e.g., disk drives, solid state drives, etc.). In one or more embodiments of the invention, the client storage (140) as well as the client (106) itself, may also, or alternatively, include off-site storage including but not limited to, cloud base storage, and long-term storage such as tape drives, depending on the particular needs of the user and/or the system.

Figure 3:
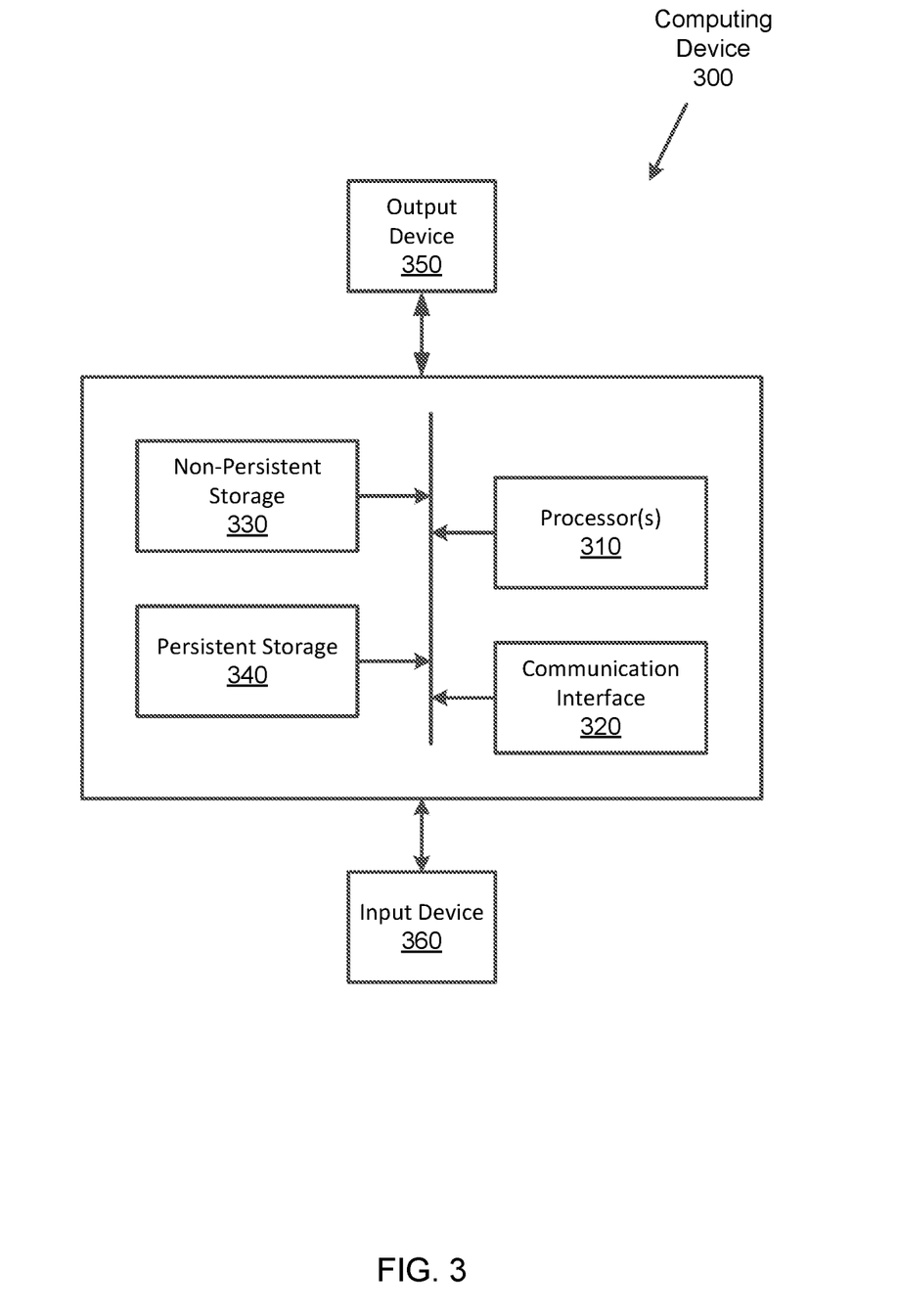
FIG. 3 shows a diagram of a computing device in accordance with one or more embodiments of the invention.

In one or more embodiments of the invention, the client (106) is implemented as a computing device (see e.g., FIG. 3). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (106) described throughout this application.

In one or more embodiments of the invention, the client (106) is implemented as a logical device. The logical device may utilize the computing resources of any number of computing devices and thereby provide the functionality of the client (106) described throughout this application.

In one or more embodiments of the invention, the group (100) of hosts (e.g., 102A-102N), group manager (110), and client(s) (106) communicate through a network (108). The network (108) may take any form including any combination of wireless and/or wired networks. The network (108) may be a local network (LAN) or a wide area network (WLAN) including the Internet or a private enterprise network that connects more than one location. The network (108) may be any combination of the above networks, other known network, or any combination of network types.

In one or more embodiments of the invention, the network (108) allows the group (100) to communicate with other groups (not shown) and external computing devices such as (but not limited to) a client (e.g., 106). The various components of the group (100) may also communicate with each other through a network. The network may be a high-speed internal network and/or include part of an external network (108). The production hosts (e.g., 102A-102N), and group manager (e.g., 110) communicate with each other over the internal network and, in one or more embodiments of the invention, provide fallback functionality.

A network (e.g., 108) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1A, the network (108) may include any number of devices within any components (e.g., 100, 102A-102N, and 110) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

Figure 2:
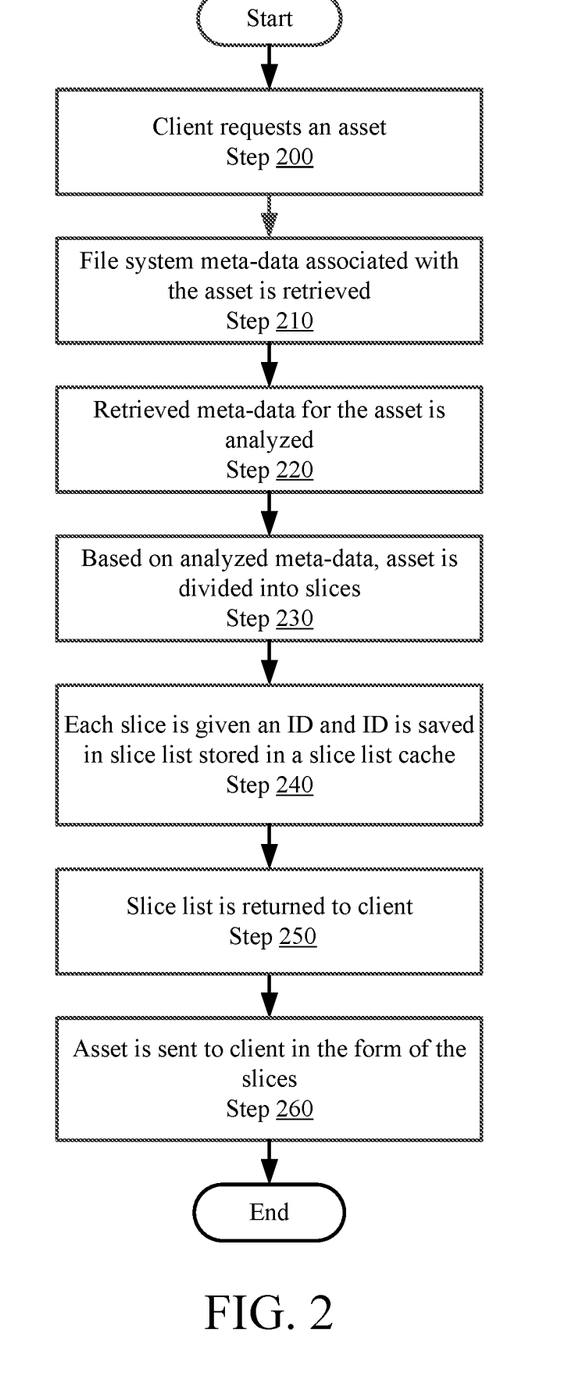
FIG. 2 shows a flowchart of a method of sharing an asset in accordance with one or more embodiments of the invention.

In one or more embodiments, network devices are configured to participate in one or more network protocols, which may include methods for sharing and/or transferring files such as the methods described in FIG. 2.

In one or more embodiments of the invention, a group (e.g., 100) may be implemented as one or more computing devices. A group (e.g., 100) may include any number of computing devices without departing from the invention. The group may include different computing devices, different quantity, and types of computer resources, and may perform different computer implemented services without departing from the invention.

In one or more embodiments of the invention, the group (100) includes a plurality of production hosts (e.g., 102A-102N) which include the functionality to obtain data protection services from a data protection manager (not shown) and/or the group manager (e.g., 110). While shown as containing only three production hosts (e.g., 102A-102N), the group (100) may include more or less production hosts without departing from the invention, for example a group (e.g., 100) may include of at least sixteen production hosts, at least fifty production hosts, or at least a hundred production hosts without departing from the invention.

Each host (e.g., 102A-102N) includes local storage (e.g., 112A-112N) for storing assets such as files and folders which may be made available to other hosts and/or clients (e.g., 106). The local storage (e.g., 112A-112N) may include one or more processors, memory (e.g., random access memory), and persistent storage (e.g., disk drives, solid state drives, etc.). In one or more embodiments of the invention, the local storage (e.g., 112A-112N) may also or alternatively comprise of off-site storage including but not limited to, cloud base storage, and long-term storage such as tape drives, depending on the particular needs of the user and/or the system. The group may also contain shared storage including at least one group shared volume (CSV) (not shown) which is active with each of the production hosts (e.g., 102A-102N) of the group (100). Other types of shared storage may also or alternatively be included such as active-passive storage and local storage (e.g., 112A-112N).

In one or more embodiments of the invention, the production hosts (e.g., 102A-102N) perform workloads and provide services to clients and/or other entities not shown in the system illustrated in FIG. 1A. The production hosts (e.g., 102A-102N) may further include the functionality to perform computer implemented services for users (e.g., clients 106) of the group (100). The computer implemented services may include, for example, database services, electronic mail services, data processing services, etc. The computer implemented services may include other and/or additional types of services without departing from the invention.

During the performance of the aforementioned services, data may be generated and/or otherwise obtained. The production hosts (e.g., 102A-102N) include local storage (e.g., 112A-112N), which may include multiple volumes, as well as shared storage which may include group shared volumes (e.g., CSVs). The various data storage volumes (e.g., 112A-112C) performing data storage services may include storing, modifying, obtaining, and/or deleting data. The data storage services may include other and/or additional services without departing from the invention. The data generated and stored on the shared storages (e.g., 112A-112N) by the production hosts (e.g., 102A-102N) may be valuable to users of the system, and therefore may be protected. The production hosts (e.g., 102A-102N) may provide backup storage services and include backup storage on the local storage (e.g., 112A-112N). The backup storage services may include storing backups of data stored on the shared storages for restoration purposes. Alternatively, the group manager (110), a client (106), or a separate backup agent (not shown) may initiate backups and other forms of protection. The backup storage services may include other and/or additional services without departing from the invention.

The production hosts (e.g., 102A-102N) may include a primary production host (e.g., 102A) and secondary production hosts (e.g., 102B and 102N). The specific configuration of which production host is the primary production host and which production host is the secondary production host may be preconfigured or may be automatically managed by the group manager (e.g., 110). The production hosts (e.g., 102A-102N) may include any number of secondary production hosts without departing from the invention. Alternatively, all production hosts (e.g., 102A-102N) may be secondary production hosts with the group manager (e.g., 110) performing the additional tasks of the primary host.

The production hosts (e.g., 102A-102N), may be operably connected to one or more group shared storages and may obtain data storage services from the one or more group shared storages. The production hosts (e.g., 102A-102N) may be operably connected to each other, and each production host (e.g., 102A) may include the ability to use all or part of the volumes, including shared active-passive drives that form the local storage (e.g., 112A-112N) of the other production hosts (e.g., 102B and 102C).

In one or more embodiments of the invention, the production hosts (e.g., 102A-102N) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (e.g., 102A-102N) described throughout this application.

In one or more embodiments of the invention, the production hosts (e.g., 102A-102N) are implemented as a logical device. The logical device may utilize the computing resources of any number of computing devices and thereby provide the functionality of the production hosts (e.g., 102A-102N) described throughout this application.

The production hosts (e.g., 102A-102N) as well as other components of the group and connected devices may perform data storage services. The data storage services may include storing, modifying, obtaining, and/or deleting data stored on the local and shared storages (e.g., 112A-112N) based on instructions and/or data obtained from the production hosts (e.g., 102A-102N) or other components of the group (e.g., 100). The data storage services may include other and/or additional services without departing from the invention. The local storages (e.g., 112A-112N) may include any number of storage volumes without departing from the invention.

The local storages (e.g., 112A-112N) and shared storages may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the local and shared storages (e.g., 112A-11N) may utilize portions of any combination of hard disk drives, solid state disk drives, tape drives, and/or any other physical storage medium of any number of computing devices.

In one or more embodiments of the invention, the production hosts (e.g., 102A-102N) as well as the associated local storages (e.g., 112A-112N) are managed by a group manager (e.g., 110). The group manager (110) performs a plurality of functions not limited to managing and configuring the services provided by the production hosts (e.g., 102A-102N), managing the mapping and movement of data on the at least she shared volumes including any group shared volumes (e.g., 120). The group manager (110) may perform other functions attributed to other components of the system or function not described herein without departing from the invention.

In one or more embodiments of the invention the group manager (110) includes the functionality to perform a portion, or all of, the data protection services of a data protection manager. This may include performing discovery of the volumes and assets associated with the production hosts (e.g., 102A-102N) including those stored on the local storage (e.g., 112A-112N). This may also include performing, or initiate backups and restorations as well as determining a preferred production host including some or all of the functions described above as well as the functions and method described in the method shown in FIG. 2A-2D and described below. The group manager (110) may include the functionality to perform and or obtain other and/or additional services without departing from the invention.

In one or more embodiments of the invention, the group manager (110) may perform discovery on the volumes and assets of the volumes and assets associated with the production hosts (e.g., 102A-102N) including those stored on the local storage (e.g., 112A-112N). The group manager queries each production host (e.g., 102A-102N) and their associated local and shared storage (e.g., 112A-112N. Using the results of the query, the group manager (110) produces an asset mapping, which is stored as file system meta-data on each of the production hosts (e.g., 102A-102N). This allows for each of the production hosts (e.g., 102A-102N) to know where a given asset is located at any given time. By updating the discovery periodically, such as, but not limited by, every fifteen seconds, the asset mapping (e.g., 128) may remain accurate and provide quicker access times with less or no inter-host messaging. Further, if one production host fails, the location of at least the shared assets is not lost.

In one or more embodiments of the invention, the group manager (110) may in addition to, or instead of other components such as a data protection manager (not shown), a backup agent (not shown) or a client (e.g., 106), determine the preferred production host for performing of data protection such as a backup on a given asset such as a specific application and its data and/or an entire volume. This may be done during the periodic discovery described above, or as a result of a request for sharing an asset with a client (e.g., 106) as described in more detail in the method shown in FIG. 2, or at any other configured time as configured by a user, administrator, or system designer/manufacturer.

In one or more embodiments of the invention, a group manager (e.g., 110) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the group manager (e.g., 110) described throughout this application.

In one or more embodiments of the invention, the group manager (110) is implemented as computer instructions, e.g., computer code, stored on a persistent storage that when executed by a processor of the group (e.g., 100) including any-one-of the production hosts (e.g., 102A-102N) to provide the functionality of the group manager (e.g., 110) described throughout this application.

In one or more embodiments of the invention, the group manager (110) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.).

The computing device may include instructions stored on the persistent storage, that when executed by the processor(s) of the computing device cause the computing device to perform the functionality of a group manager (e.g., 110) described throughout this application.

In one or more embodiments of the invention, the group manager (110) is implemented as a logical device. The logical device may utilize the computing resources of any number of computing devices and thereby provide the functionality of the group manager (e.g., 110) described throughout this application.

In one or more other embodiments of the invention, one or more of the functions of the group manager (e.g., 110, FIG. 1) may be performed by a data protection manager (not shown), a backup storage (not shown), the individual production hosts (e.g., 102A-102N, FIG. 1), a client (e.g., 106), or other component of the system without departing from the invention.

Figure 1B:
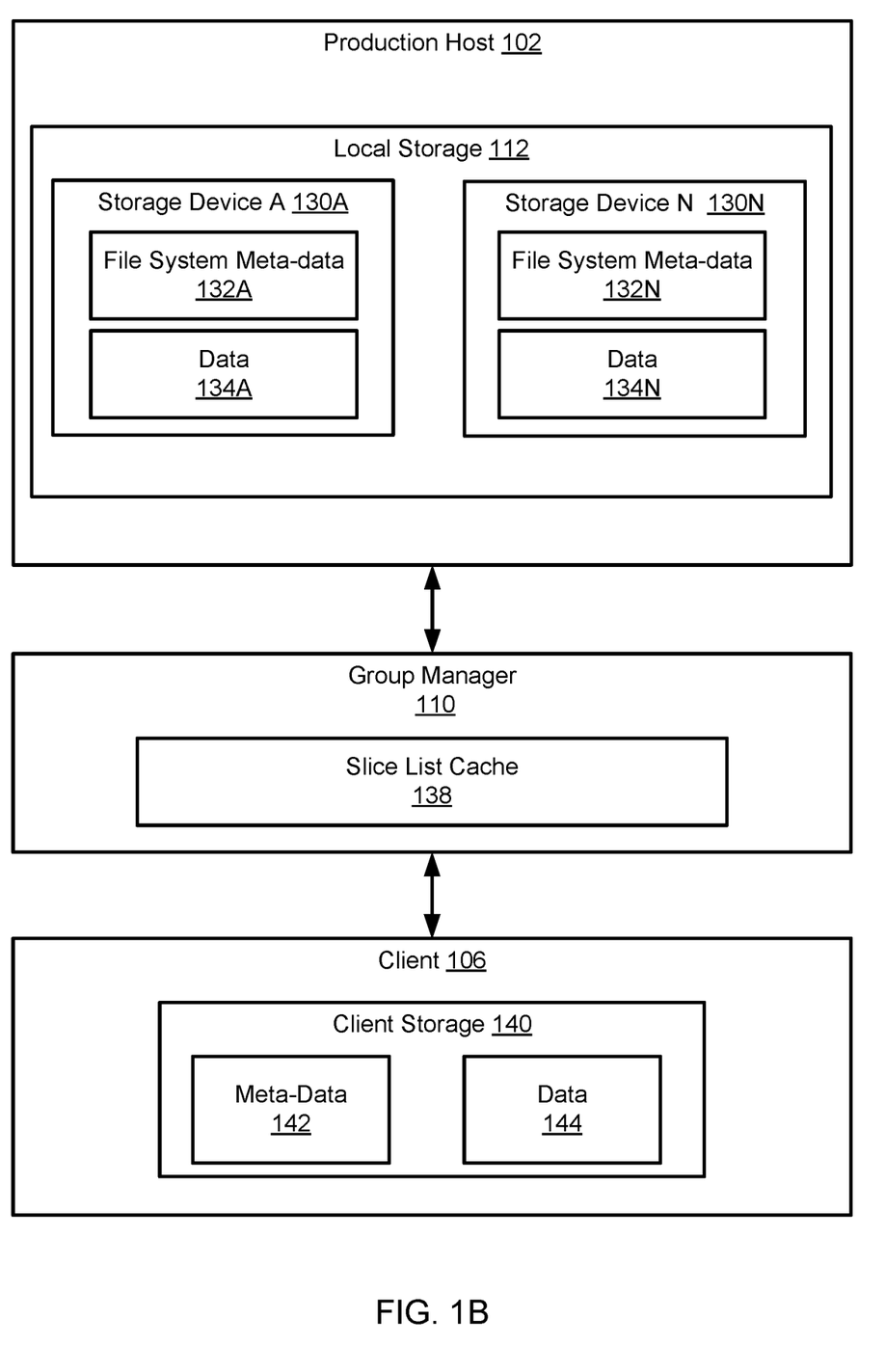
FIG. 1B shows a detailed diagram of the system and a related client in accordance with one or more embodiments of the invention.

Turning now to FIG. 1B, FIG. 1B shows a diagram of specific components utilized in sharing or transferring an asset between production host (e.g., 102) and a client (e.g., 106) in accordance with one or more embodiments of the invention. The production host (e.g., 102) communicates with one or more clients (e.g., 106) and a group manager (e.g., 110). Each component illustrated in FIG. 1B is discussed below.

The production host (e.g., 102) may be similar to the production hosts (e.g., 102A-102N) as discussed above in reference to FIG. 1A. The production host (e.g., 102) may include VMs, a hypervisor, a production agent, and local storage (e.g., 112) that includes a plurality of storage devices (e.g., 130A-130N). The production host may include additional, fewer, and/or different components without departing from scope of the invention. Each component may be operably connected to any of the other component via any combination of wired and/or wireless connections.

As discussed above, the production host may provide computer implemented services to the client(s) (e.g., 106). To provide and obtain the aforementioned computer implemented services, the production host may include application(s) which are stored and store data on the local storage (e.g., 112). The production host may include other and/or additional components without departing from the invention.

The production host (104) includes storage devices, e.g., 130A and 130N. The storage devices include a file system meta-data repository (e.g., 132A, 132N) and data (e.g., 134A, 134N). A file system meta-data repository (e.g., 132N) may be one or more data structures that include information regarding application data stored in the file system repository. The information included in the file system meta-data repository (e.g., 132A, 132N) in one or more embodiments of the invention may be determined as a normal function of the file system of each storage device (e.g., 130A-130N), as part of a meta-data-based backup (MBB), or other functions requested by any of the client (e.g., 106), group manager (e.g., 110) or other components of the system.

The information included in the file system meta-data repository (e.g., 132A, 132N) in one or more embodiments of the invention may be used to for determining the files and folders that are associated with an asset, producing estimates of the size of files and folders associated with the asset and/or other functions such as performing slicing as will be described in more detail with regards to the method shown in FIG. 2. The information included in the file system meta-data repository (e.g., 132A, 132N) in one or more embodiments of the invention may be additionally used by the backup to generate backups and historical meta-data. The file system meta-data repository (e.g., 132A, 132N) may include other and/or additional information without departing from the invention.

The storage devices (e.g., 130A, 130N), may include one or more data structures (e.g., 134A, 134N) that may include the actual data associated with one or more applications. The storage devices (e.g., 130A, 130N) may include data (e.g., 134A, 134N also referred to as "asset data") generated by the hosts (users of the application(s) such as the client e.g., 106). The asset data may be any type of data such as, but not limited to, database data and email data generated by users of the application(s) (e.g., 112, 114, FIG. 1A) without departing from the invention. Each storage device (e.g., 130A-130N) may include any number of applications and associated assets as well as assets not associated with a specific application. Each asset may include any quantity of asset data and may be organized as files and folders or in other systems of organization. Furthermore, each asset may include any number of elements without departing from the invention. Users (e.g., individuals operating the clients (e.g., 106) may use the data, e.g., 134A and 134N, stored on the storage devices, e.g., 130A and 130N, when obtaining computer implemented services from the production host (e.g., 102). Additionally, the target data, e.g., 134A and 134N, stored on the storage devices, e.g., 130A and 130N, of the production host (e.g., 104), may be obtained by clients (e.g., 106) or other components of the system such as backup agents (not shown) to perform functions. The data, e.g., 134A and 134N, of the file system storage devices, e.g., 130A and 130N, may be used by other and/or additional entities for other and/or additional purposes without departing from the invention.

In one or more embodiments of the invention, a group manager (110) manages the production hosts. This may include such functions as tracking where assets are located on individual hosts (e.g., 102) and/or storage devices (e.g., 130A-130N) associated with the hosts (e.g., 102A-102N). In one or more embodiments of the invention the group manager (110) determines how to slice an asset that is requested by the client (106). As will be described in more detail below with regards to the method of claim 2, when a client (e.g., 106) requests an asset located on a host (e.g., 102) on one or more of its storage devices (e.g., 130A-130N), the group manager (110) utilizes the file-system meta-data (e.g., 132A-132N) located on each of the hosts (e.g., 102A-102N) to determine where the asset is located as well as the size of the asset. Based on this analysis and predetermined criteria (determined by a user, by a manufacturer, and/or an application) the group manager determines as set number of slices to divide the asset up into and assigns each slice an ID. The slice ID along with the location of the portions of the asset assigned to a slice are saved to a slice list cache (138). The asset may then be sent or transferred to the client (106) in the form of the slices.

Once produced, the slice list is stored in the slice list cache (138). In one or more embodiments of the invention, this slice list cache (e.g., 138) is stored in storage associated with the group manager (e.g., 110). Alternatively, the slice list cache (e.g., 138) can be stored in the local storage (e.g., 112) of any of the hosts (e.g., 102A-102N). The slice list cache (e.g., 138) can be stored in other locations without departing from the invention.

The stored slice list may be used when a future request is made from the client (106) for the same asset, if no changes have occurred to the underlying data forming the asset since the initial share of the asset with the client (106). This allows the asset to be quickly sliced up and transferred to the client (106). However, if changes occur to the underlying data, in one or more embodiments of the invention, the slice list may be updated to reflect the changes automatically or periodically (based on user, application, and/or manufactures configuration), which will allow the slice list to be accurate and up-to-date.

In one or more embodiments of the invention the slice list, may be maintained in the slice list cache (138) for a predetermined period of time. For example, if a user, manufacturer, and/or application configures the predetermined period of time to be one week, once a week of time has elapsed and the slice list cache has not been accessed, the slice list may be purged. Other time periods such as but not limited to a predetermined number of minutes hours, days, years, etc. may be used to determine when to purge a specific slice list based on the amount of storage available to the group manager (110) and/or other criteria, including but not limited to if the underlying data is changed.

In one or more embodiments of the invention, a client (e.g., 106) as described in more detail above with regards to FIG. 1A, requests the asset from the production host (e.g., 102) or through an intermediary such as the group manager (e.g., 110) or a backup agent (not shown). The client (e.g., 106) may include its own storage (e.g., client storage 140), where the asset, once transferred may be stored as data (e.g., 144) and associated meta-data (e.g., 142). In one or more embodiments of the invention the slice list may be stored alternatively or in addition to the slice list cache (e.g., 138) in the client storage's meta-data (e.g., 142).

The client (e.g., 106) may take the form of a physical device that may include circuitry. The physical device may be, for example, a field-programmable gate array, application specific integrated circuit, programmable processor, microcontroller, digital signal processor, or other hardware processor. The physical device may be adapted to provide the functionality of the clients (e.g., 106) as described throughout this application. In one or more embodiments of the invention, the clients (e.g., 106) are implemented as computer instructions, e.g., computer code, stored on a persistent storage that when executed by a client or user, causes a processor to provide the functionality of the client (e.g., 106).

FIG. 2 shows a flowchart of a method of sharing files using slices in accordance with one or more embodiments of the invention. The method may be performed by, for example, a group manager (e.g., 110, FIG. 1A), or an individual production host (e.g., 102A-102N, FIG. 1A). Other components of the system illustrated in FIGS. 1A and 1B may perform all, or a portion of the method of FIG. 2 without departing from the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

In step 200, the system receives a request from a client (e.g., 106, FIG. 1A) for an asset. The asset may be a file, a plurality of files as well as folders or other resources that are in general associated with the asset requested by the client (e.g., 106, FIG. 1A). When the request for an asset is received, the group manager (e.g., 110, FIG. 1A) or an appropriate production host (e.g., 102A-102N, FIG. 1A) determines the location of the asset and prepares the asset to be sent to the client (e.g., 106, FIG. 1A).

In one or more embodiments of the invention, the request for an asset may be related to providing files and folders needed for an application that is being executed on the client (e.g., 106, FIG. 1A). For example, the client may be executing a database application and needs the related database data. In another example, the client may be performing a backup of a particular application hosted by a production host and needs all data stored in the production host related to that application. The requested asset may take numerous forms and is not limited by the previous two examples.

Once the client requests the asset in step 200, the method proceeds to step 210. In step 210, file-system meta-data associated with the asset is retrieved. The group manager (e.g., 110, FIG. 1B), which received the request in step 200, may request meta-data from the file-system metadata (e.g., 132A-132N, FIG. 1B) stored on the local storage (e.g., 112, FIG. 1B). Alternatively, the meta-data may already be stored in a common file-system meta-data file that is stored for example in the group manager (e.g., 110, FIG. 1B).

Once the file-system meta-data associated with the asset is identified and retrieved, the method proceeds to step 220. Where it is analyzed and parsed, to determine the specific files and folders associated with the asset. The meta-data for the specific files and folders is analyzed to determine the total size of the files and folders as well as number of files and folders (or other resources) associated with the asset.

Once the total number and size of the files and folders associated with the asset is determined, the method proceeds to step 230. In step 230 information on the total number and size of folders is used to determine the number of slices needed to transport the asset. Alternatively, the number of slices needed may be predetermined based user or administrator preferences, and/or on criteria such as the total number of streams available between the group (e.g., 100, FIG. 1A) and the client (e.g., 106).

Once the group manager (e.g., 110, FIG. 1B) or production host determines the number of slices to use, the assets may be divided up into the slices. The division may be such that each file is located on a single slice. In one or more embodiments of the invention, a number of files assigned to a single slice, such that, for a non-limiting example, that each slice has an equal size (amount of data contained in the slice) within a predetermined threshold. In other instances of one or more embodiments of the invention, a single file itself may be divided into separate slices, such as when a single file is larger than one slice as might be the case, for example, with a large backup or database file. The files may be sliced in many different ways without deviating from the scope of the disclosed invention.

Once the meta-data is analyzed and the files and folders of the asset are assigned to slices, the method proceeds to step 240, where each slice is assigned an ID and the meta-data for the assets assigned to each slice are recorded in a list along with the ID. This list then may be saved to a slice list cache (e.g., 138, FIG. 1B). Alternatively, the slice list cache may be saved to local storage (e.g., 112, FIG. 1B) or even on the client (e.g., 106, FIG. 1B).

By storing the list to a slice list cache (e.g., 138, FIG. 1B), when one or more clients (e.g., 106, FIG. 1A) requests the same asset, steps 210-240 do not need to be repeated. This may result in significant savings in processing, and if the asset is large, result in less time needed for pre-processing before actually transferring the asset. As discussed above this slice list cache needs to be periodically updated and/or purged when it is no-longer relevant. The slice list cache may be, in one or more embodiments of the invention, updated whenever a routine discovery process detects or indicates that the asset has been altered. Alternatively, each slice list stored in the slice list cache (e.g., 138, FIG. 1B) may be updated periodically on a schedule, such as every five days or every hour, or other preconfigured period of time.

Once the slice list is produced in step 240, the slice list and associated meta-data is sent to the client in step 250, the files and folders associated with the asset are then transferred or sent to the client (e.g., 106, FIG. 1B) in the form of the slices in step 260. The client, in one or more embodiments of the invention, once receiving all the slices, may then save the files and folders associated with the asset to the client storage (e.g., 140, FIG. 1B). In one or more embodiments of the invention, the client may act on the data as needed based on the specific application or user instructions.

The method may end following step 260.

Additionally, as discussed above, embodiments of the invention may be implemented using computing devices. FIG. 3 shows a diagram of a computing device in accordance with one or more embodiments of the invention. The computing device (300) may include one or more computer processors (310), non-persistent storage (330) (e.g., volatile memory, such as random access memory (RAM), cache memory), persistent storage (340) (e.g., a hard disk, an optical drive such as a compact disk (CD) drive or digital versatile disk (DVD) drive, a flash memory, etc.), a communication interface (320) (e.g., Bluetooth interface, infrared interface, network interface, optical interface, etc.), input devices (360), output devices (350), and numerous other elements (not shown) and functionalities. Each of these components is described below.

In one embodiment of the invention, the computer processor(s) (310) may be an integrated circuit for processing instructions. For example, the computer processor(s) may be one or more cores or micro-cores of a processor. The computing device (300) may also include one or more input devices (360), such as a touchscreen, keyboard, mouse, microphone, touchpad, electronic pen, or any other type of input device. Further, the communication interface (320) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (350), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (310), non-persistent storage (330), and persistent storage (340). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to transferring or sharing applications between a host and a requesting client. In one or more embodiments, assets such as files and folders that are to be shared or transferred are placed in appropriate network slice queues by the hosts or the group manager rather than the clients. These network slice queues allow the files and folders to be placed in slices without utilizing the resources of the clients as well as much of the available network resources. This ensures efficient use of network resources, while minimizing the amount of work the hosts and/or clients must perform in order to perform a backup.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for sharing files, the method comprising: receiving, by a production host, a request from a client for an asset located on the production host; retrieving file-system meta-data associated with the asset; analyzing the file-system meta-data to determine how to divide a data associated with the asset into slices, wherein the data comprises a plurality of files, wherein analyzing the file-system meta-data determines a total size, and a number, of the plurality of files; slicing the data associated with the asset into the slices based on the total size, and the number, of the plurality of files; and sending the slices to the client.

2. The method of claim 1, the method further comprising:
   assigning an identification to each slice of the slices;
   adding the identification for each slice of the slices to a slice list for the asset; and
   saving the slice list for the asset in a slice list cache.

3. The method of claim 2, wherein the slice list cache is stored in local storage of the production host.

4. The method of claim 3, wherein if the production host determines that the meta-data associated with the asset has changed, the production host updates the slice list.

5. The method of claim 3, wherein the slice list for the asset is stored in the slice list cache for a predetermined amount of time before the slice list is deleted.

6. The method of claim 2, the method further comprising:
   receiving a subsequent request from a second client for the asset;
   retrieving the slice list stored in the slice list cache;
   slicing the data associated with the asset in accordance with the slice list stored in the slice list cache to obtain the slices; and
   sending the slices to the second client.

7. A non-transitory computer readable medium comprising computer readable program code, which when executed by a computer processor enables the computer processor to perform a method for sharing files, the method comprising: receiving, by a production host, a request from a client for an asset located on the production host; retrieving system meta-data associated with the asset; analyzing the file-system meta-data to determine how to divide a data associated with the asset into slices, wherein the data comprises a plurality of files, wherein analyzing the file-system meta-data determines a total size, and a number, of the plurality of files; slicing the data associated with the asset into the slices based on the total size, and the number, of the plurality of files; and sending the slices to the client.

8. The non-transitory computer readable medium of claim 7, the method further comprising:
assigning an identification to each slice of the slices;
adding the identification for each slice of the slices to a slice list for the asset; and
saving the slice list for the asset in a slice list cache.

9. The non-transitory computer readable medium of claim 8, wherein the slice list cache is stored in local storage of the production host.

10. The non-transitory computer readable medium of claim 9, wherein if the production host determines that the meta-data associated with the asset has changed, the production host updates the slice list.

11. The non-transitory computer readable medium of claim 9, wherein the slice list for the asset is stored in the slice list cache for a predetermined amount of time before the slice list is deleted.

12. The non-transitory computer readable medium of claim 8, the method further comprising:
receiving a subsequent request from a second client for the asset;
retrieving the slice list stored in the slice list cache;
slicing the data associated with the asset in accordance with the slice list stored in the slice list cache to obtain the slices; and
sending the slices to the second client.

13. A system comprising: a production host comprising: a processor; and a memory operatively connected to the processor and comprising instructions, which when executed by the processor, perform a method for sharing files, the method comprising: receiving a request from a client for an asset located on the production host; retrieving file-system meta-data associated with the asset; analyzing the file-system meta-data to determine how to divide a data associated with the asset into slices, wherein the data comprises a plurality of files, wherein analyzing the file-system meta-data determines a total size, and a number, of the plurality of files; slicing the data associated with the asset into the slices based on the total size, and the number, of the plurality of files; and sending the slices to the client.

14. The system of claim 13, the method further comprising:
assigning an identification to each slice of the slices;
adding the identification for each slice of the slices to a slice list for the asset; and
saving the slice list for the asset in a slice list cache.

15. The system of claim 14, wherein the slice list cache is stored in local storage of the production host.

16. The system of claim 15, wherein if the production host determines that the meta-data associated with the asset has changed, the production host updates the slice list.

17. The system of claim 15, wherein the slice list for the asset is stored in the slice list cache for a predetermined amount of time before the slice list is deleted.

18. The system of claim 14, the method further comprising:
receiving a subsequent request from a second client for the asset;
retrieving the slice list stored in the slice list cache;
slicing the data associated with the asset in accordance with the slice list stored in the slice list cache to obtain the slices; and
sending the slices to the second client.

* * * * *